A. J. McCAULEY.
CAR TRUCK.
APPLICATION FILED DEC. 18, 1911.
1,027,748.
Patented May 28, 1912.
3 SHEETS—SHEET 1.
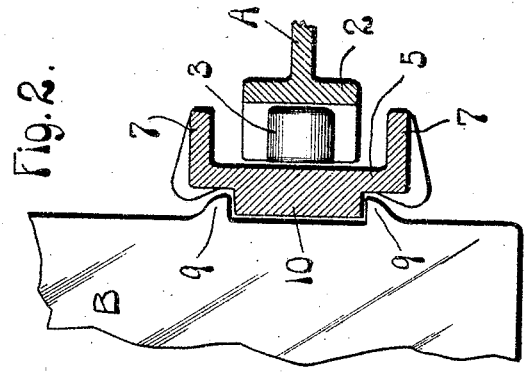
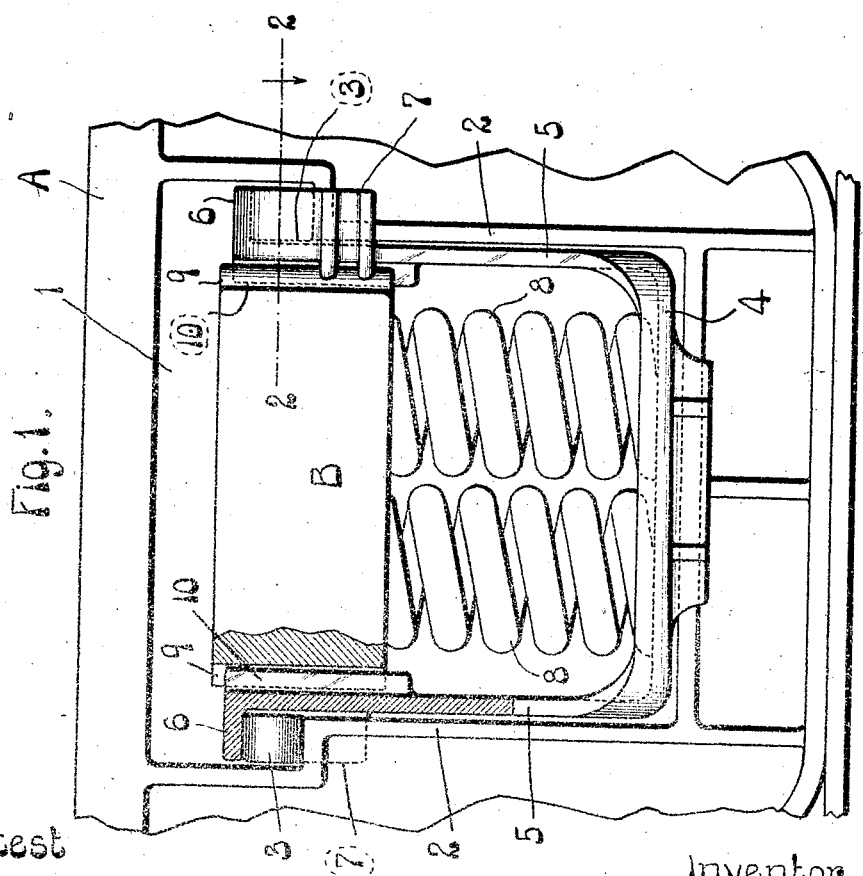
Attest
C. N. Martens
Pannie E. Weber.
Inventor
Albert J. McCauley A. J. McCAULEY.
CAR TRUCK.
APPLICATION FILED DEC. 18, 1911.
1,027,748.
Patented May 28, 1912.
3 SHEETS—SHEET 2.
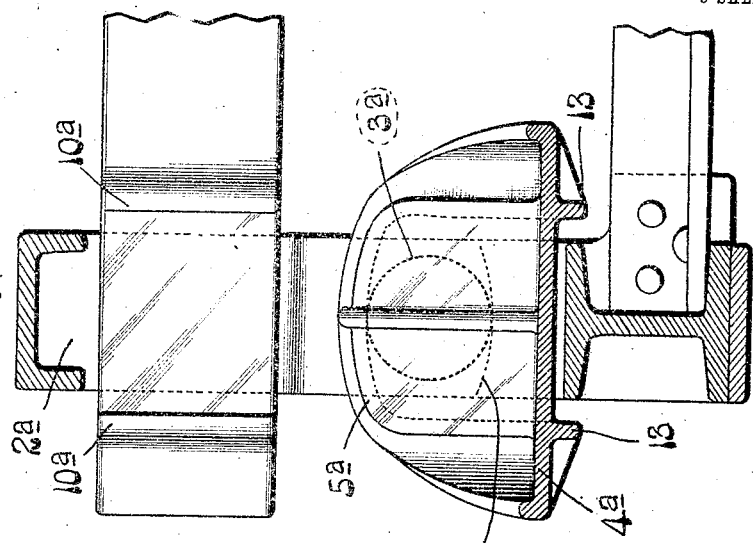
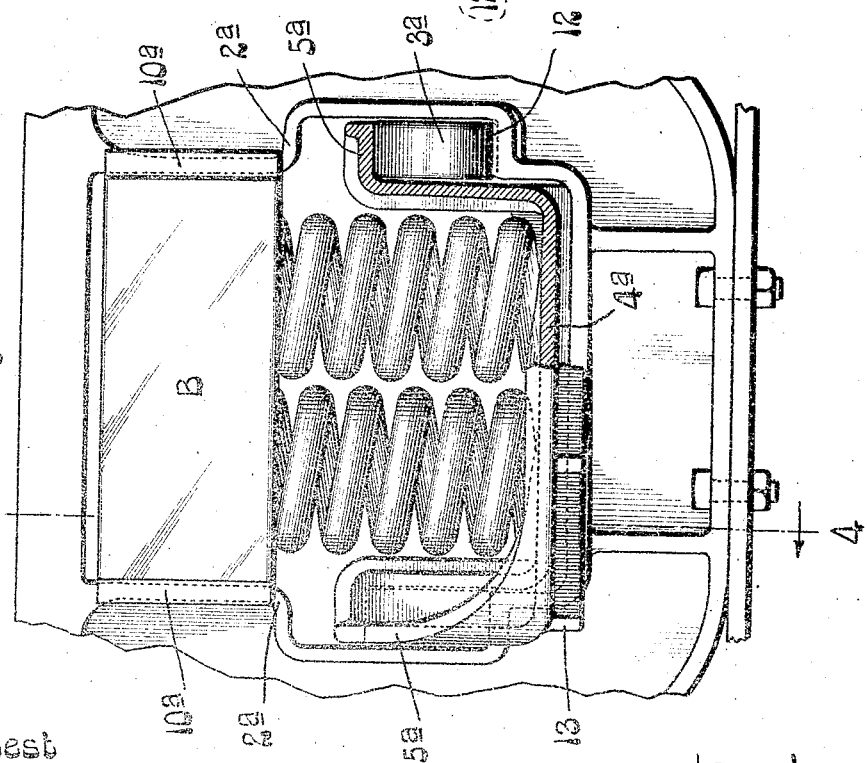
Attest
C. H. Martens
Fannie E. Weber
Inventor:
Albert J. McCauley

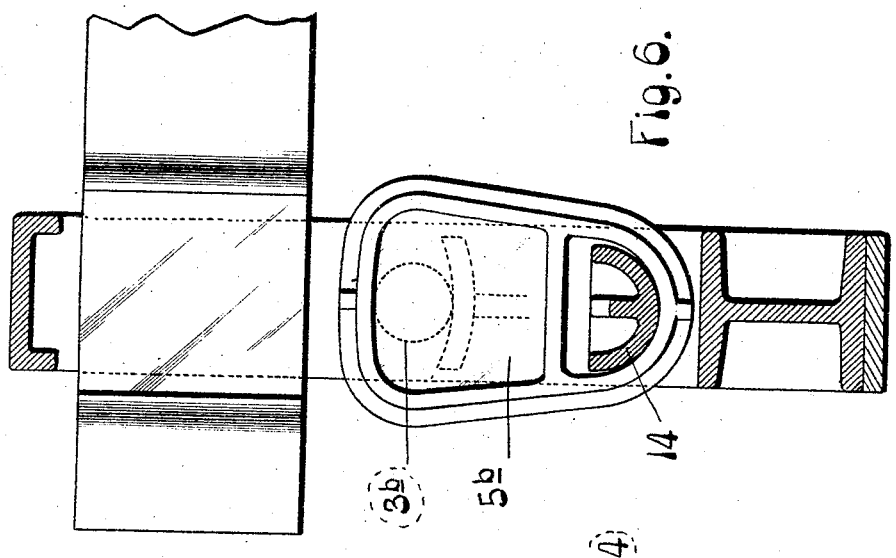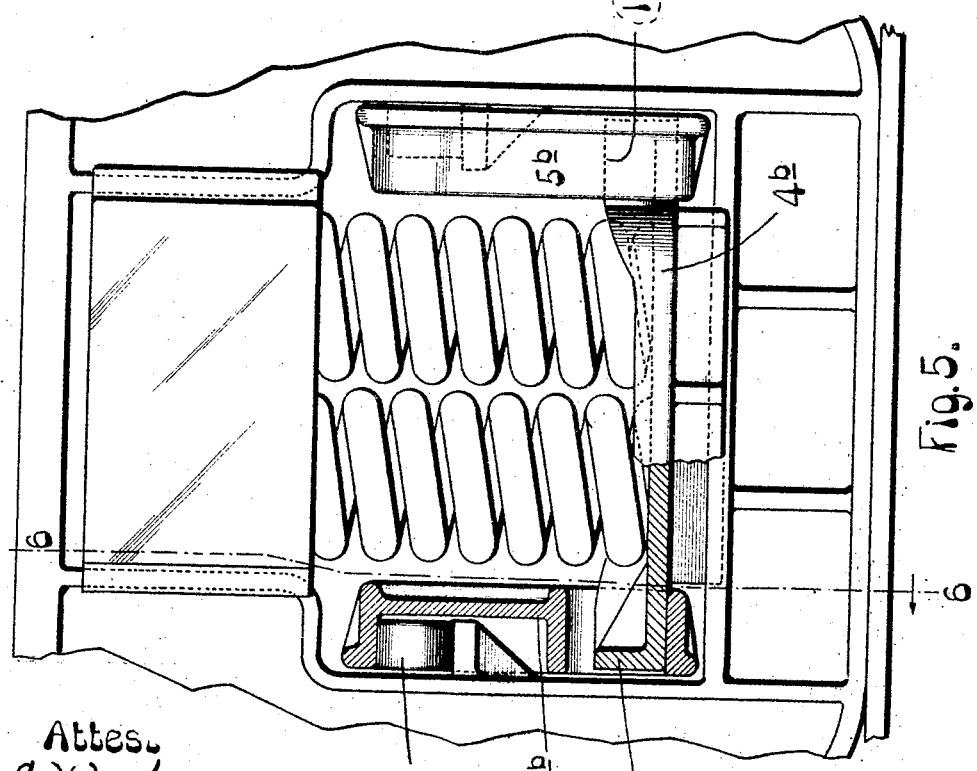

UNITED STATES PATENT OFFICE.

ALBERT J. McCAULEY, OF ST. LOUIS, MISSOURI.

CAR-TRUCK.

1,027,748.  Specification of Letters Patent.  Patented May 28, 1912.

Application filed December 18, 1911. Serial No. 666,545.

*To all whom it may concern:*

Be it known that I, ALBERT J. MCCAULEY, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, in which—

Figure 1 is a side elevation, partly in section, of a portion of a car truck embodying the features of my invention; Fig. 2 is a horizontal section taken approximately on line 2—2, Fig. 1; Fig. 3 is a view similar to Fig. 1, illustrating a modification; Fig. 4 is a vertical section taken approximately on line 4—4, Fig. 3; Fig. 5 is a view similar to Fig. 1 illustrating a further modification; and Fig. 6 is a vertical section taken approximately on line 6—6, Fig. 5.

This invention relates to improvements in car trucks of the lateral motion type, one of the objects being to produce a truck of this character in which the seats for the bolster springs are supported by movable members that allow said spring-seats to move freely so as to permit the bolster to move laterally with respect to the truck frame. In the preferred form of my invention the spring seats move "laterally" with the bolster and in this respect they operate very similar to the ordinary swing motion spring seats, however the swing motion spring seats are connected to the truck frame by pivot pins, while the spring seats of my invention have hangers which ride on rockers or rollers. The rollers are mounted on curved or inclined seats so as to move freely in response to movements of the bolster and return to normal position after the force causing such movement has ceased. In addition to allowing the bolster to move freely in response to movements of the car body, this lateral motion truck is constructed to allow the bolster and spring seats to be very easily removed from the truck frame. Furthermore the ordinary swing motion truck has pivot pins which must frictionally engage oscillating hangers carrying the entire weight of the car body, and this obviously undesirable feature is not present in my improved truck.

The accompanying drawings illustrate the invention in connection with a freight car truck but it will be understood that various other designs of trucks, including passenger car trucks, and locomotive trucks, may be equipped with the lateral motion elements set forth in the claims.

A, designates a portion of a truck frame which is shown merely to illustrate the function of the lateral motion devices, said truck frame having a bolster receiving opening 1, the side walls of which are preferably formed by columns 2. The columns shown in Fig. 1 and Fig. 2 are offset to provide seats for rollers 3 or other movable members adapted to rock in response to movements of the bolster.

4 designates a spring seat provided with hangers 5 having extensions 6 at their upper ends which overlap and rest upon the top faces of the rollers 3. The hanger extensions are preferably shaped to form pockets for the reception of the rollers, and the side walls 7 of said pockets constitute abutments for limiting the movement of the spring seat, said walls or abutments 7 being normally separated from the columns as seen in Fig. 2.

A bolster B is mounted on springs 8 supported by the spring seat 4. The usual lugs or column guides 9 on the bolster are interlocked with or otherwise suitably fitted to lugs 10 on the hangers 5. A freight car truck of the type shown will of course require two sets of the elements seen in Fig. 1, each end of the bolster being interlocked with a pair of the spring seat hangers 5.

From the foregoing it will be understood that the rollers 3 allow the bolster B, springs 8 and spring seat 4 to move laterally with respect to the truck frame, and that such movement is limited by the members 7 at the upper ends of the hangers. As the spring seat hangers ride freely on the rollers when the bolster moves "laterally", the spring seat does not rock like the ordinary pivoted swing motion spring seats. The springs are therefore not distorted by an unequally distributed compression such as they would receive if carried by a rocking spring seat frictionally engaged with pivot pins.

In removing the bolster, the first step is to remove the springs 8, then allowing the bolster to drop to a point below the lugs 10 on the hangers 5, and thereafter passing the bolster through the space between said hangers. After the removal of the bolster, the spring seat may be removed by lifting it to disengage the roller pockets from the truck frame, and then passing said pockets through the enlarged upper portion of the bolster receiving opening.

The bolster B shown in Fig. 3 and Fig. 4 has column guides 10ᵃ adapted to engage columns 2ᵃ on the truck frame. The springs supporting this bolster are mounted on spring seats 4ᵃ having hangers 5ᵃ which ride on rollers 3ᵃ. The spring seat hangers 5ᵃ are provided with curved or inclined faces which rest on the rollers and the columns have curved or inclined roller seats 12 for the purpose of causing the spring seat and bolster to normally occupy the position shown. The movement of the bolster is limited by the column guides 10ᵃ, and the spring seat movement is limited by lugs 13 on the bottom face of said seat.

Fig. 5 and Fig. 6 illustrate a spring seat 4ᵇ having curved extensions 14 fitted to hangers 5ᵇ. The hangers are provided with curved faces which rest on rollers 3ᵇ, said rollers being supported by curved seats on the truck frame.

Having thus described the invention, what is claimed as new and desired to be secured by Letters Patent is:—

1. A car truck having a frame, rollers on said frame, and a spring seat having hangers which rest on said rollers.

2. A car truck having a frame, rollers on said frame, and a spring seat having hangers which overlap and rest on the top faces of said rollers.

3. A car truck having a frame, movable spring seat supports on said frame, a spring seat provided with hangers which are carried by said movable spring seat supports, springs on said spring seat, and a bolster mounted on said springs, said bolster being fitted to said spring seat hangers.

4. A car truck having a frame, rollers on said frame, a spring seat provided with hangers which rest on said rollers, springs on said spring seat, and a bolster mounted on said springs, said bolster being fitted to said spring seat hangers.

5. A car truck having a frame, rollers on said frame, a spring seat provided with hangers which rest on said rollers, springs on said spring seat, and a bolster mounted on said springs, said bolster being interlocked with said spring seat hangers.

In testimony whereof I hereunto affix my signature in the presence of two witnesses, this 15th day of December, 1911.

ALBERT J. McCAULEY.

Witnesses:
C. H. MARTENS,
FANNIE E. WEBER.